(12) United States Patent
Burghard et al.

(10) Patent No.: US 12,583,526 B2
(45) Date of Patent: Mar. 24, 2026

(54) MOTOR VEHICLE COMPRISING A ROOF HAVING A FIRST AREA AND TWO SECOND AREAS

(71) Applicant: Bayerische Motoren Werke Aktiengesellschaft, Munich (DE)

(72) Inventors: Kai Burghard, Rosenheim (DE); Dominik Exner, Otterfing (DE); Niko Fontein, Unterschleissheim (DE); Matthias Stangl, Friedberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 365 days.

(21) Appl. No.: 18/034,921

(22) PCT Filed: Nov. 3, 2021

(86) PCT No.: PCT/EP2021/080528
§ 371 (c)(1),
(2) Date: May 2, 2023

(87) PCT Pub. No.: WO2022/096516
PCT Pub. Date: May 12, 2022

(65) Prior Publication Data
US 2023/0406076 A1 Dec. 21, 2023

(30) Foreign Application Priority Data
Nov. 6, 2020 (DE) ..................... 10 2020 129 352.6

(51) Int. Cl.
*B62D 25/06* (2006.01)
*B60J 7/043* (2006.01)
(Continued)

(52) U.S. Cl.
CPC .............. *B62D 25/06* (2013.01); *B60J 7/043* (2013.01); *B62D 35/007* (2013.01); *B62D 37/02* (2013.01)

(58) Field of Classification Search
CPC ...... B62D 25/06; B62D 35/00; B62D 35/001; B62D 35/008; B62D 37/00; B62D 37/02
(Continued)

(56) References Cited

U.S. PATENT DOCUMENTS 3,446,528 A * 5/1969 Barenyi ................. B62D 25/06
296/215
3,728,537 A * 4/1973 Barenyi ............... B60Q 1/2611
296/210
(Continued)

FOREIGN PATENT DOCUMENTS

DE 10 2007 039 315 A1 2/2009
DE 10 2014 114 487 A1 4/2015
(Continued)

OTHER PUBLICATIONS

International Search Report (PCT/ISA/210) issued in PCT Application No. PCT/EP2021/080528 dated Feb. 14, 2022 with English translation (five (5) pages).
(Continued)

*Primary Examiner* — Dennis H Pedder
(74) *Attorney, Agent, or Firm* — Crowell & Moring LLP

(57) ABSTRACT

A motor vehicle includes a roof that has a first area and two second areas, wherein, in the transverse direction of the vehicle, the first area is located between the two second areas, and the roof is lower in the first area than in the two second areas.

11 Claims, 3 Drawing Sheets

(51) Int. Cl.
    *B62D 35/00*        (2006.01)
    *B62D 37/02*        (2006.01)

(58) Field of Classification Search
    USPC ........... 296/210, 180.1, 185.1, 181.5, 193.12
    See application file for complete search history.

(56)            References Cited

U.S. PATENT DOCUMENTS

| | | | |
|---|---|---|---|
| 6,857,695 B2 * | 2/2005 | Stoffels | B60J 7/11 |
| | | | 296/218 |
| 7,222,908 B1 | 5/2007 | Cho | |
| 7,237,835 B2 * | 7/2007 | Leroy | B60R 9/055 |
| | | | 296/193.04 |
| 2002/0003359 A1 | 1/2002 | De Gaillard | |
| 2006/0290169 A1 * | 12/2006 | Fukushima | B62D 35/007 |
| | | | 296/180.1 |

FOREIGN PATENT DOCUMENTS

| | | |
|---|---|---|
| EP | 1 151 884 A1 | 11/2001 |
| FR | 2 744 957 A1 | 8/1997 |
| JP | 60-68871 U | 5/1985 |
| JP | 2016-64731 A | 4/2016 |

OTHER PUBLICATIONS

German-language Written Opinion (PCT/ISA/237) issued in PCT Application No. PCT/EP2021/080528 dated Feb. 14, 2022 (five (5) pages).
German-language Search Report issued in German Application No. 10 2020 129 352.6 dated Jul. 16, 2021 with partial English translation (10 pages).

\* cited by examiner

Foldable and/
or removable
roof

MOTOR VEHICLE COMPRISING A ROOF HAVING A FIRST AREA AND TWO SECOND AREAS

BACKGROUND AND SUMMARY

The present disclosure relates to motor vehicles having a roof with a first area and two second areas, and production methods for corresponding roofs.

In particular elevated vehicles such as SUVs, transporters or vans suffer from poor aerodynamics because the elevated design hinders aerodynamically expedient design. Many SUV and transporter customers desire improved aerodynamics for their vehicles in order to reduce fuel consumption. There are barely any vehicle body shapes which have a lot of luggage space and/or a high seat position and which simultaneously have a low degree of air resistance. Improvements in these areas are desirable.

One object lies in providing a more efficient vehicle.

This object is achieved by the disclosed technology which is defined by the subject matters of the independent claims. The dependent claims relate to corresponding further developments. Various aspects and embodiments of these aspects which provide additional features and advantages are disclosed below.

Some embodiments achieve the special object of providing a large vehicle with improved aerodynamics. In this case, the improvements lie in the roof construction. The roof construction has an M-shaped cross-section. The roof has two elevated areas on the vehicle sides. In the center, the roof is, in contrast, lowered with respect to the sides. Such a vehicle advantageously appears large in a side view and can furthermore use the space provided by the elevated roof sides for other functions or structures. As a result of the lowered center part, the vehicle furthermore has reduced air resistance in comparison with vehicles with a straight roof construction of the same height.

Further aspects and embodiments of these aspects are disclosed below.

A first aspect relates to a motor vehicle comprising a roof, wherein the roof has a first area and two second areas, and wherein:

in the transverse direction of the vehicle, the first area is arranged between the two second areas; and
the roof is lower in the first area than in the second areas.

A motor vehicle can be in particular a car, e.g. an SUV (Sport Utility Vehicle) or a van or a transporter. A motor vehicle can additionally also be a limousine or a station wagon. The disclosed roof constructions are, however, suitable for all types of motor vehicles, from small cars to HGVs.

The area "in the roof" is in particular also encompassed as a first area. This is because many roof constructions now have a spatial characteristic. If a height of the roof is discussed or the fact that a roof in one area is lower than in another area, in particular the height of the surface of the roof in this area is meant as the reference point for this indication of dimension.

The transverse direction of a vehicle represents the direction transverse to the direction of travel. The longitudinal direction of the vehicle is in contrast the direction in which the vehicle moves straight ahead.

A motor vehicle which is large from a side view and which furthermore provides a comparatively large useable space can advantageously be formed by a roof which is lower in the center than at the sides. As a result of the lowered first area which can be located in particular in the center of the roof, an improvement in the aerodynamics can furthermore be achieved for this vehicle, which is reflected in particular in energy requirements and/or in reduced wind noise which the vehicle generates during travel.

The first area can be in particular flat. Additionally or alternatively, the first area can, however, also be arched or sloping to the rear.

The second areas can be formed in particular with the same shape or in mirror symmetry to the center axis in the longitudinal direction of the vehicle. A second area can be formed to be round or square or angular in cross-section. A second area can vary in terms of its height. In particular, a second area at the front side of the roof, in the center of the roof or at the end of the roof can be the highest or lowest. As a result of the higher formation of the roof in the second areas, in particular a useable space can be produced in the second areas. Additionally or alternatively, the higher areas can serve to improve vehicle ergonomics.

The proportions in the side view of the motor vehicle are improved by an alignment in a crown shape with external indentations in cross-section, wherein the aerodynamics are under a low level of strain via a relatively small cross-sectional surface enlargement which is composed above all of the indentations. The space which arises in the crown or in the indentations can be used to take on various customer- and safety-relevant functions. Examples of such functions and structures are described below.

One embodiment of the first aspect relates to a motor vehicle, wherein the roof is a steep construction.

A steep roof construction can be composed in particular of the same material as the rest of the vehicle body. Alternatively, the roof can also be constructed from components which relate to the first and/or second areas. For example, one or more roof components can thus relate to the first area. Additionally or alternatively, one or more components can relate to one or both second areas. In particular, one area can comprise a different material to the rest of the vehicle body. For example, the first area and/or one or both second areas can comprise a metal and/or a fiber composite. The first area can in particular comprise a sliding roof. Additionally or alternatively, the second areas can comprise light-permeable components.

One embodiment of the first aspect relates to a motor vehicle, wherein the roof comprises a foldable and/or removable construction, in particular for folding and/or removing the first area.

In particular, the space which arises in the second areas of the roof can have a mechanism for folding, in particular for automatic folding, of a roof and/or a part of a roof.

One embodiment of the first aspect relates to a motor vehicle, wherein a distance between an upper side of the first area and an upper side of one or both second areas relates to more than 5, 10, 15, 20, 25 or 30 cm.

The distance between an upper side of the first area and one or both second areas indicates in particular the height of the indentations of the roof or the size of the roof crown.

Many embodiments are also contemplated in the case of the width of the first area or in the case of the width of one or both second areas. The width of one or both second areas can be small, e.g. less than 5, 10, 15 or 20 cm. Additionally or alternatively, the width of one or both second areas can be greater than 20, 25, 30, 35 or 40 cm. In particular, the width can be selected to be so large that a corresponding space is created above the driver or the passenger. An improved space sensation can advantageously be produced for the occupants as a result.

One embodiment of the first aspect relates to a motor vehicle, wherein a first distance between an upper side of the first area and an upper side of one or both second areas deviates from a second distance between the upper side of the first area and the upper side of one or both second areas.

The first distance can be defined, for example, at the front side of the vehicle roof and the second distance can be defined at the rear side of the vehicle roof, i.e. at the rear side of the vehicle. In particular, the first distance can be smaller than the second distance. In particular, the first area declines towards the rear side of the vehicle. The first distance which is measured at the front side of the vehicle can then be smaller than the second distance at the rear side of the vehicle, for example, if the second areas run at a constant height.

One embodiment of the first aspect relates to a motor vehicle, wherein a trailing edge and/or a spoiler is arranged at the end of the first area and/or at the end of the second areas.

A trailing edge or a spoiler can be arranged at the end of the first area and/or at the end of the two second areas. In particular, the roof in the first area and/or in the second areas can form a transition into a trailing edge and/or a spoiler. As a result of this, the aerodynamics of the vehicle can be further improved. In particular, this embodiment can be combined with the previous embodiment.

One embodiment of the first aspect relates to a motor vehicle, wherein the second areas terminate the roof toward the vehicle sides.

As a result of this, a coherent side front of the vehicle body can be generated as well as the overall impression of a high vehicle. The space encompassed by the second areas can furthermore advantageously contribute to improved spatial comfort of the vehicle occupants. Additionally or alternatively, the space encompassed by the second areas can be used for arrangement of parts of the door mechanism.

One embodiment of the first aspect relates to a motor vehicle, wherein an upper side or one or more doors are higher than the first area of the roof.

In particular, a part of a door can adjoin a second area of the roof so that a side view of the vehicle arises substantially from the surface of the door and a second area of the roof. As a result of this, the overall impression of a high vehicle can likewise be achieved and/or improved spatial comfort for the vehicle occupants. Improved ease of getting into the vehicle is in particular possible if the head does not have to be lowered too far. Additionally or alternatively, the space provided by the second areas can be used for parts of the door mechanism and/or other functions and/or structures.

One embodiment of the first aspect relates to a motor vehicle, wherein one or both second areas of the roof has/have at least one of the following features:

a structure for operating a sliding roof, in particular a connecting member for opening and/or closing the sliding roof;

a structure for operating an airbag, in particular one or more head airbags;

one or more cables for operating the vehicle;

a structure for vehicle air-conditioning;

electronics for operating the vehicle;

a structural component of the vehicle body.

The features are arranged in particular in the space which is formed by the elevated second areas (indentations) in the roof. Moreover, the space which arises in the second areas can also be used for other structures and/or functions of the vehicle. For example, a vehicle antenna can be arranged in a second area. Additionally or alternatively, one or both second areas can be used for a storage space, in particular to stow elongated objects, such as skis.

One embodiment of the first aspect relates to a motor vehicle, wherein a receptacle for a roof rail and/or a luggage rack is arranged on one or both second areas.

Additionally or alternatively, the second areas can also be configured to accommodate a roof or side luggage carrier. In particular, the second areas can be designed to accommodate a bicycle carrier.

A second aspect relates to a method, wherein the method is configured to form a first area and two second areas, wherein the first area is formed between the two areas and wherein the roof in the first area is formed to be lower than in one or both second areas.

A production method is configured in particular to form the roof of a motor vehicle according to the first aspect.

Further advantages and features will become apparent from the following embodiments which relate to the figures. The figures do not always show the embodiments true to scale. The dimensions of the various features can be correspondingly made bigger or smaller in particular for the purpose of clarity of the description.

DETAILED DESCRIPTION OF THE DRAWINGS

In the following descriptions, identical reference numbers relate to identical features or features which are at least functionally or structurally similar.

In the following description, reference is made to the accompanying drawings which form a part of the disclosure and in which specific aspects in which the present disclosure can be understood are shown for the purpose of illustration.

A disclosure about a described method generally also applies to a corresponding device in order to carry out the method or produce the device or to a corresponding system which comprises one or more devices, and vice versa. If, for example, a special method step is described, a corresponding device can comprise a feature in order to carry out the described method step even if this feature is not explicitly described or represented. If, on the other hand, for example, a special device is described on the basis of functional units and/or structure features, a corresponding method can comprise a step which carries out the described functionality or with which a corresponding structure can be produced even if such steps are not explicitly described or represented. A system with corresponding device features can likewise be provided or with features to carry out a specific method step. Features of the various aspects and embodiments described above or below can be combined with one another unless indicated expressly otherwise.

Figure 1:
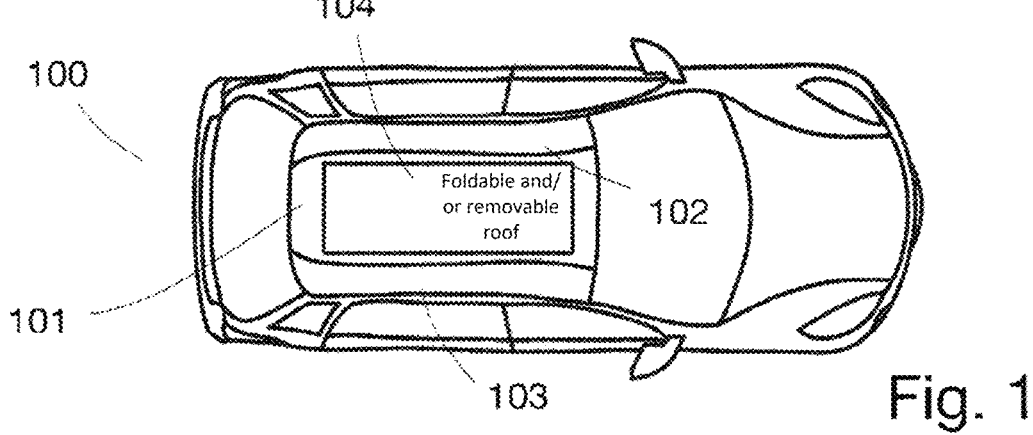
FIG. 1 is a plan view of a vehicle with a roof according to one embodiment of the disclosure.

FIG. 1 discloses a plan view of a vehicle 100 according to one embodiment of the disclosure. The roof comprises a first area 101 which is arranged in the center. The roof furthermore comprises a first second area 102 and a second second area 103 which are arranged on the outer sides of the roof. The second areas are higher by a height H than the first area of the roof. This is explained in even greater detail in the following description. The opening of sliding roof 104 is arranged in the first area 101. The mechanism for operating the sliding roof is arranged partially in the second areas. In particular, a connecting member and a drive for moving the sliding roof are arranged in the second areas. This means that the connecting member and the drive are arranged in the space which is made available by the elevated second areas of the roof.

Figure 2:
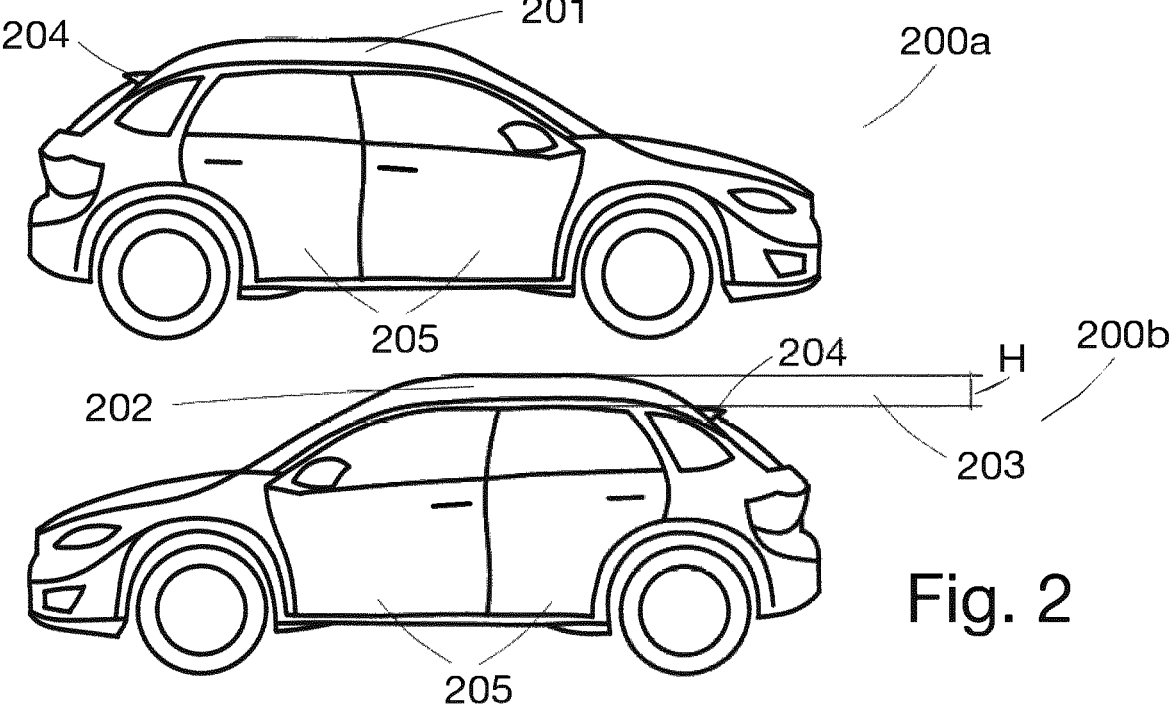
FIG. 2 shows views of both sides of a vehicle with a roof according to one embodiment of the present disclosure.

FIG. 2 discloses the vehicle 100 from FIG. 1 in a first side view 200*a* and a second side view 200*b*. A side view 201 of the second raised roof area 103 from FIG. 1 can be seen in the side view 200*a*. A side view 202 of the second raised roof area 102 from FIG. 1 can correspondingly be seen in the side view 200*b*. The first area is largely covered in the two side views since it is not higher at any point than the second areas. A trailing edge 204 which represents an end of the first region can be seen solely at the end of the roof. The second areas have a height difference H in comparison with the first area. It is furthermore apparent that the doors protrude into the side areas 201, 202. This means that the upper sides of the doors are at least partially higher than the first area. This is also apparent on the basis of the fact that the doors are arranged slightly higher than the trailing edge 204. In particular, ease of getting in is improved as a result of the enlarged door frames.

Figure 3:
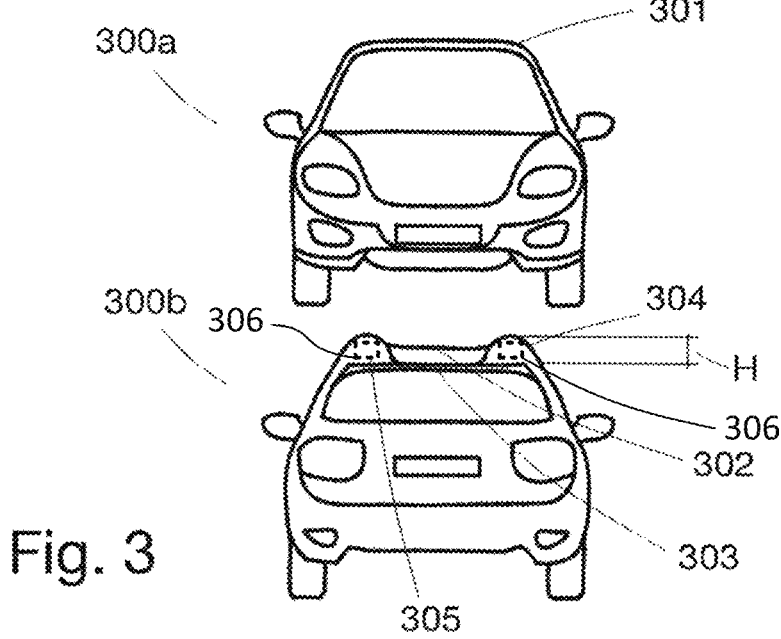
FIG. 3 shows views of the front side and rear side of a vehicle with a roof according to one embodiment of the present disclosure.

FIG. 3 discloses the vehicle 100 from FIG. 1 in a front view 300*a* and a rear view 300*b*. The roof 301 is formed substantially of the same shape in the front view 300*a*. No height difference is apparent between the first area and the second areas. The first area 302 nevertheless drop downwards toward the rear side. This is apparent in the rear view 300*b*. The end 303 of the first region 302 at the side of the roof facing the rear side of the vehicle is arranged lower than the start of the first area which faces the front side. The indentations 304, 305 which are formed by the elevated second areas in the roof are clearly apparent in this view. The end of the first area 302 forms an M-shaped joint cross-section with the cross-section on the upper sides of the second areas. The height difference between the end 303 of the first area and the upper side of the second area 304, 305 is represented by the parameter H. The aerodynamics of the vehicle are improved by the sloping first area 302. As a result of the elevated second areas 304, 305, the vehicle has a side view which has a powerful appearance. The spaces which are formed by the second areas can simultaneously be used for vehicle functions or vehicle structures 306 (shown only schematically). For example, spatial comfort in the area of the heads of the occupants can be improved. Additionally or alternatively, cables, parts of air-conditioning systems or airbags, vehicle electronics, antennae, etc. can be arranged in spaces of the second areas.

LIST OF REFERENCE NUMBERS

100 Vehicle
101 First area of the roof
102 Second area of the roof
103 Third area of the roof
104 Opening of the sliding roof
200*a* Side view of the vehicle
200*b* Side view of the vehicle
201 Second area of the roof
202 Second area of the roof
203 Height difference between first area and the second areas of the roof
204 Trailing edge
205 Vehicle doors 300*a* Front view of the vehicle
300*b* Rear view of the vehicle
301 Vehicle roof
302 Start of the first area of the roof
303 End of the first area of the roof
304 Second area of the roof
305 Second area of the roof
306 Vehicle structures (shown only schematically)

The invention claimed is:

1. A motor vehicle, comprising:
a roof comprising a first area and two second areas, wherein
in a transverse direction of the vehicle, the first area is arranged between the two second areas, and
the roof is configured to be lower in the first area than in the two second areas; and
a trailing edge and/or a spoiler arranged at, and extending rearwardly beyond, an end of the first area and/or at an end of the two second areas,
wherein an upper side of one or more lateral side doors of the vehicle is configured to be higher than the trailing edge and/or the spoiler.

2. The motor vehicle according to claim 1, wherein the roof comprises a rigid construction.

3. The motor vehicle according to claim 1, wherein the roof comprises a foldable and/or removable construction.

4. The motor vehicle according to claim 3, wherein the foldable and/or removable construction is configured for folding and/or removing the first area or a part of the first area.

5. The motor vehicle according to claim 1, wherein a distance between an upper side of the first area and an upper side of one or both of the two second areas is more than one of: 5, 10, 15, 20, 25 or 30 cm.

6. The motor vehicle according to claim 1, wherein a first distance between an upper side of the first area and an upper side of one or both of the two second areas deviates from a second distance between the upper side of the first area and the upper side of one or both of the two second areas.

7. The motor vehicle according to claim 1, wherein the two second areas terminate the roof toward lateral sides of the vehicle.

8. The motor vehicle according to claim 1, wherein one or both of the two second areas of the roof comprise at least one of:
a structure for operating a sliding roof;
a structure for operating an airbag;
one or more cables for operating the vehicle;
a structure for vehicle air-conditioning;
electronics for operating the vehicle; or
a structural component of the vehicle body.

9. The motor vehicle according to claim 8, wherein the structure for operating the sliding roof is a connecting member for opening and/or closing the sliding roof; and/or
the structure for operating the airbag comprises one or more head airbags.

10. The motor vehicle according to claim 1, wherein a receptacle for a roof rail and/or a luggage rack is arranged on one or both of the two second areas.

11. A method of producing a roof of a motor vehicle, comprising:
forming a first roof area and two second roof areas of the roof, wherein the first roof area is formed between the two second roof areas, and the roof is configured to be lower in the first roof area than in one or both of the two second roof areas;

forming a trailing edge and/or spoiler, wherein the trailing edge and/or spoiler is arranged at, and extending rearwardly beyond, an end of the first area and/or at an end of the two second areas;

forming an upper side of one or more lateral side doors of the vehicle so as to be higher than the trailing edge and/or the spoiler.

\*   \*   \*   \*   \*